US008744218B2

(12) United States Patent
Nakagami et al.

(10) Patent No.: US 8,744,218 B2
(45) Date of Patent: Jun. 3, 2014

(54) DEVICE, METHOD AND PROGRAM FOR GENERATION AND COMPRESSION OF SUPER RESOLUTION VIDEO

(75) Inventors: Ohji Nakagami, Tokyo (JP); Junichi Tanaka, Kanagawa (JP); Yoichi Yagasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/539,987

(22) Filed: Jul. 2, 2012

(65) Prior Publication Data

US 2012/0269273 A1 Oct. 25, 2012

Related U.S. Application Data

(63) Continuation of application No. 12/141,197, filed on Jun. 18, 2008, now Pat. No. 8,233,746.

(30) Foreign Application Priority Data

Jun. 18, 2007 (JP) ................................. 2007-160591

(51) Int. Cl.
*G06K 9/32* (2006.01)

(52) U.S. Cl.
USPC ......................................................... 382/299

(58) Field of Classification Search
None
See application file for complete search history.

(56) References Cited

U.S. PATENT DOCUMENTS

| 2001/0048719 | A1* | 12/2001 | Takeuchi et al. ......... 375/240.15 |
| 2002/0063807 | A1 | 5/2002 | Margulis |
| 2005/0057687 | A1* | 3/2005 | Irani et al. ..................... 348/443 |
| 2009/0244365 | A1 | 10/2009 | Takeda et al. |
| 2009/0263044 | A1* | 10/2009 | Imagawa et al. ............... 382/275 |
| 2009/0274380 | A1* | 11/2009 | Wedi .............................. 382/233 |
| 2010/0054338 | A1* | 3/2010 | Suzuki et al. ............ 375/240.16 |
| 2010/0272184 | A1 | 10/2010 | Fishbain et al. |
| 2010/0290762 | A1 | 11/2010 | Kobayashi et al. |

FOREIGN PATENT DOCUMENTS

| EP | 1 631 055 | 3/2006 |
| JP | 2004-312276 | 11/2004 |
| JP | 2004-312277 | 11/2004 |

(Continued)

OTHER PUBLICATIONS

Xu, et al., "Compressed Video Super-resolution Reconstruction Based on Regularized Algorithm," *The Thirteen National Iconography and Graphics Academic Conference Symposium*, Nov. 30, 2006, 5 pages.

(Continued)

*Primary Examiner* — Nirav G Patel
(74) *Attorney, Agent, or Firm* — Finnegan, Henderson, Farabow, Garrett & Dunner, LLP

(57) ABSTRACT

An image processing device is provided that includes an image acquisition unit that obtains video data that includes a plurality of consecutive frames, and also obtains image data that correspond to some of the frames and have a higher spatial resolution than the frames. The image processing device also includes a super resolution processing unit that uses a plurality of the frames to perform super resolution processing on the frames, and that generates super resolution images that correspond to the frames. The image processing device further includes a motion estimation unit that uses the video data to detect a motion vector between the super resolution images and an image generation unit that, based on the super resolution images corresponding to the image data and on the motion vector, generates motion compensated image data that corresponds to the frames.

12 Claims, 8 Drawing Sheets

(56) References Cited

FOREIGN PATENT DOCUMENTS

| | | |
|---|---|---|
| JP | 2006-74180 | 3/2006 |
| JP | 2007-205 | 1/2007 |
| JP | 2007-60437 | 3/2007 |

OTHER PUBLICATIONS

First Office Action issued by Chinese Patent Office in coresponding Application No. 20120093229.5 dated Mar, 5. 2014, 16 pages.

\* cited by examiner

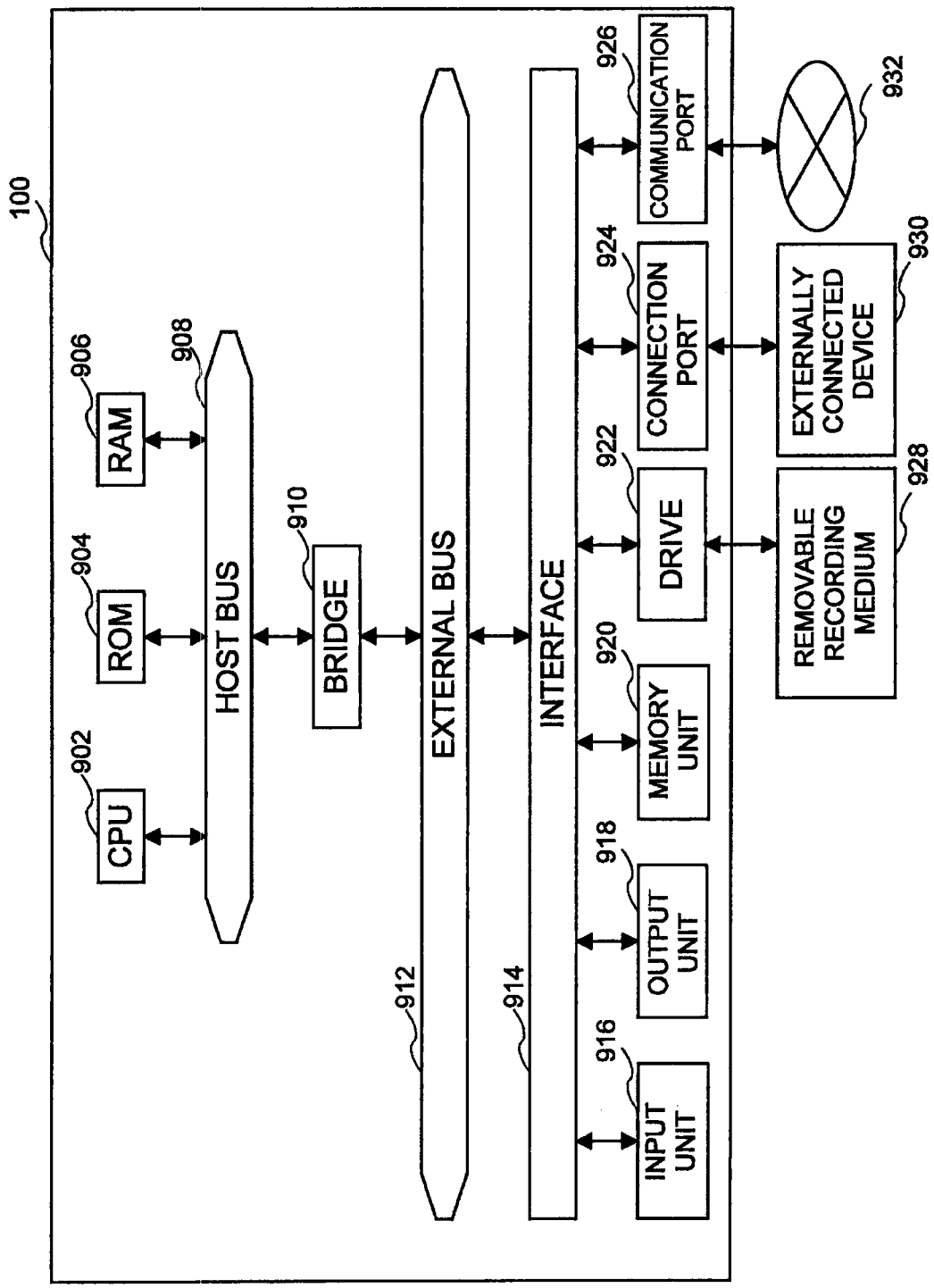

DEVICE, METHOD AND PROGRAM FOR GENERATION AND COMPRESSION OF SUPER RESOLUTION VIDEO

CROSS-REFERENCES TO RELATED APPLICATIONS

This is a continuation of allowed application Ser. No. 12/141,197, filed June 18, 2008, now U.S. Pat. No. 8,233,746, which claims priority to Japanese Patent Application JP 2007-160591 filed in the Japan Patent Office on Jun. 18, 2007, the entire contents of both of which are expressly incorporated herein by reference in their entirety.

BACKGROUND OF THE INVENTION

1. Field of the Invention

The present invention relates to an image processing device, an image processing method and a program.

2. Description of the Related Art

In recent years, there have been significant advances in technologies relating to the distribution of digital image data (hereinafter referred to as "image data"). In relation to these technologies, notable advances have been made in technologies for the distribution and recording of high quality image data. Of these notable technologies, technologies relating to the encoding and decoding of image data are attracting a high degree of attention. Image data with a high degree of spatial resolution and temporal resolution have an extremely large data size. For that reason, users wish to efficiently compress the encoded image data to distribute or record it. Given this situation, there is demand for the development of encoding technologies allowing the compression of high resolution image data with higher compressibility, and the development of highly advanced decoding technologies that allow play back at a higher spatial resolution.

In relation to these technologies, a method is suggested, for example, in Japanese Patent Application Publication No. JP-A-2004-312276 and in Japanese Patent Application Publication No. JP-A-2004-312277, to generate image data with a high degree of both spatial resolution and temporal resolution by combining first image data and second image data. The first image data has low spatial resolution, but high temporal resolution (for example, video data etc.), and the second image data has high spatial resolution but low temporal resolution (for example, a series of picture data etc.). With this method, the technology relates to the prediction of motion vectors between frames using the first image data. The motion vectors and the second image data are then used to correct the high frequency components of the first image data. With this technology, a frame from a selected point in time that is not included among the second image data is generated using a motion vector detected from the first image data and a frame from the second image data from a point in time close to the selected point in time. Further, image data storage and playback devices that generate image data with high spatial and temporal resolution using the technology described above are also described in the above-mentioned documents.

Alternatively, a technology termed super resolution is well known as a method to generate high resolution images from a plurality of low resolution images. The technology known as super resolution combines a plurality of overlapping low resolution images, and calculates the pixel value of each pixel corresponding to a single-frame high resolution image. Using this method, high resolution images can be realized with a high resolution exceeding the resolution of image sensors such as a charge coupled device (CCD) or a complementary metal oxide semiconductor (CMOS). For example, super resolution technology is used in the generation of high resolution satellite photographs. However, when compared to methods where high resolution image data that includes high frequency components are used to correct images, the high resolution performance of the super resolution technology is substantially poorer.

SUMMARY OF THE INVENTION

When using the methods described in each of the above documents, there is a dependency on the accuracy of the motion vector estimation, and noise may occur in the high frequency components. For that reason, technologies allowing a high accuracy of motion vector estimation are in demand. Also, if there is a long interval between shots for the high resolution still image data that is referred to, more precise motion vector estimation accuracy is required. To address these requirements, an embodiment of the present invention, based on the above-described super resolution technology, provides a method that uses motion estimation and motion compensation technologies to correct the high frequency components of high resolution still image data, to generate high resolution images.

An embodiment of the present invention provides a new and improved image processing device, image processing method and program that allow the generation of higher quality high resolution image data at a chosen timing, using a series of low resolution image data and high resolution image data.

According to an embodiment of the present invention, there is provided an image processing device that includes an image acquisition unit that obtains video data that includes a plurality of consecutive frames, and also obtains image data that correspond to some of the frames and have a higher spatial resolution than the frames; a super resolution processing unit that performs super resolution processing on the frames by using a plurality of the frames, and that generates super resolution images that correspond to the frames; a motion estimation unit that detects a motion vector between the super resolution images by using the video data; and an image generation unit that, based on the super resolution images corresponding to the image data and on the motion vector, generates motion compensated image data that corresponds to the frames.

The image processing device may further include a magnified image generation unit that generates a magnified image with the same spatial resolution as one of the super resolution images by using one of the frames; and a phase distortion detection unit that detects phase distortion between the super resolution image and the magnified image which correspond to the one of the frames.

The image processing device may further include a phase distortion correction unit that, based on the phase distortion detected by the phase distortion detection unit, corrects the phase distortion of the super resolution image.

The image processing device may further include a motion vector compensation unit that, based on the phase distortion detected by the phase distortion detection unit, corrects the result of the motion vector estimation between the super resolution images.

The super resolution processing unit may function to perform super resolution processing without performing resolution conversion on the frame.

The magnified image generation unit may function to perform resolution conversion on the frame on which super resolution processing has been performed, and generate the magnified image, and the motion estimation unit may function to detect the motion vector between the magnified images.

The image processing device may further include a memory unit that records the video data and the image data. The image acquisition unit may function to obtain the video data and the image data recorded in the memory unit.

The first series of image data may be recorded in the memory unit as the video data, having low spatial resolution and high temporal resolution. The second series of image data which correspond to the images included in the first series of image data, having higher spatial resolution and lower temporal resolution than the first series of image data.

The image generation unit may function to designate one of the frames that is included in the first series of image data and that is not included in the second series of image data as a selected frame, and generate the image data corresponding to the selected frame and improve the temporal resolution of the second series of image data.

The video data that is recorded in the memory unit may be a series of image data obtained by performing downsampling on captured image signals.

At the time of performing motion compensation, when an amount of difference between the super resolution image and the image data is greater than a predetermined value, the image generation unit may function to change, according to the amount of difference, a ratio of merging the selected frame that is the motion vector referrer and the image data that is the motion vector referent.

According to another embodiment of the present invention, there is provided an imaging method including the steps of; obtaining video data that includes a plurality of consecutive frames, and obtaining image data that correspond to some of the frames and have a higher spatial resolution than the frames; performing super resolution processing on the frames using a plurality of the frames, and generating super resolution images that correspond to the frames; predicting a motion vector by detecting a motion vector between the super resolution images using the video data; and generating, based on the super resolution images corresponding to the image data and on the motion vector, motion compensated image data that correspond to the frames.

According to another embodiment of the present invention, there is provided a computer program that includes instructions that command a computer to perform the functions of the image processing device. Further, a recording medium is provided on which the program mentioned above is recorded.

According to the embodiments of the present invention described above, higher quality high resolution image data can be generated at a selected timing, using a series of low resolution image data in combination with high resolution image data.

BRIEF DESCRIPTION OF THE DRAWING(S)

FIG. 8 is an explanatory diagram showing the hardware configuration of an information processing device that can realize the functions of the image processing device according to the present embodiment.

DETAILED DESCRIPTION OF THE PREFERRED EMBODIMENT(S)

Figure 1:
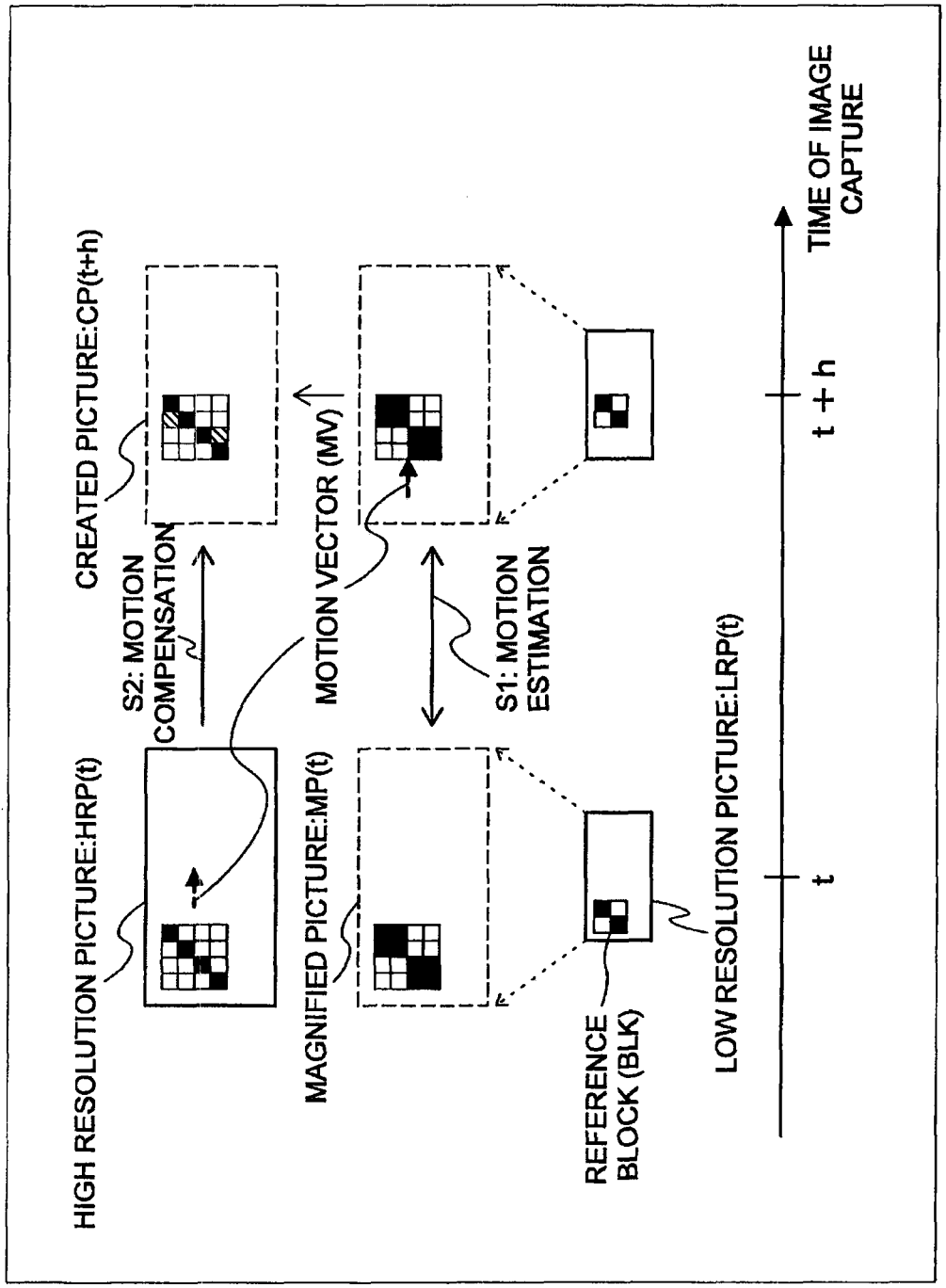
FIG. 1 is an explanatory diagram illustrating a high resolution image generation method.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

(High Resolution Image Generation Method)

First, before explaining the image processing device and image processing method according to the embodiments of the present invention, a basic explanation will be made, with reference to FIG. 1, of the idea of using a series of continuously recorded image data with low spatial resolution in combination with high spatial resolution data to generate high resolution image data. The series of continuously recorded image data with low spatial resolution (hereinafter sometimes referred to as the "video data") is combined with the intermittently recorded high spatial resolution data (hereinafter sometimes referred to as the "picture data" or the "high resolution picture (HRP)") that corresponds to an appropriate frame (hereinafter sometimes referred to as the "low resolution picture (LRP)") included in the video data, to generate the high resolution image data (hereinafter referred to as the "created picture (CP)") that corresponds to a selected frame included in the video data. FIG. 1 is an explanatory diagram showing an example of a high resolution image generation method.

FIG. 1 depicts a high resolution picture HRP (t), a low resolution picture LRP (t), a low resolution picture LRP (t+h), a magnified scale image (hereinafter sometimes referred to as the "magnified picture (MP)") MP(t), a magnified picture MP (t+h), and a created picture CP (t+h). Here, the letters inside the brackets indicate the time at which the image is captured. For example, the created picture CP (t+h) indicates the created picture corresponding to the low resolution picture LRP (t+h) that is captured at the time t+h.

The created picture CP is image data generated from a motion vector detected using the low resolution picture LRP, with motion compensation performed using the high resolution picture HRP. For example, as shown in FIG. 1, the magnified picture MP (t) that is generated by magnifying the low resolution picture LRP (t), and the magnified picture MP (t+h) that is generated by magnifying the low resolution picture LRP (t+h) are used to detect the motion vector (MV) between the time t and the time t+h (step S1). Next, based on the motion vector MV, a high resolution picture HRP (t) reference block corresponding to a low resolution picture LRP (t) reference block (BLK) is extracted. Then the reference block pixels and the magnified picture MP (t+h) pixels are merged at a predetermined ratio to generate the created picture CP (t+h) (step S2).

In the above example, motion estimation and motion compensation are performed using substantially differing images. Although the magnified picture MP, which is generated by magnifying the low resolution picture LRP, is magnified to the same spatial resolution as the high resolution picture HRP, compared to the high resolution picture HRP, the magnified picture MP lacks high frequency components. For that reason, discrepancies may arise between the motion vector detected using the magnified picture MP and the original motion vector for the high resolution picture HRP. If motion estimation accuracy is low, the position of the reference block in the high resolution picture HRP may be displaced. Noise therefore becomes added to the high frequency components of the created picture CP generated after motion compensation.

Here, technology is required to suppress the noise that becomes added as a result of motion compensation that is performed based on a plurality of image data with differing spatial resolutions. Motion vector errors become larger when there is an interval between the time t at which the high resolution picture HRP (t) is captured and the time t+h at which the created picture CP (t+h) is to be generated. For that reason, an technology is required to obtain a high resolution created picture CP (t+h), even when the time interval h is large.

Figure 2:
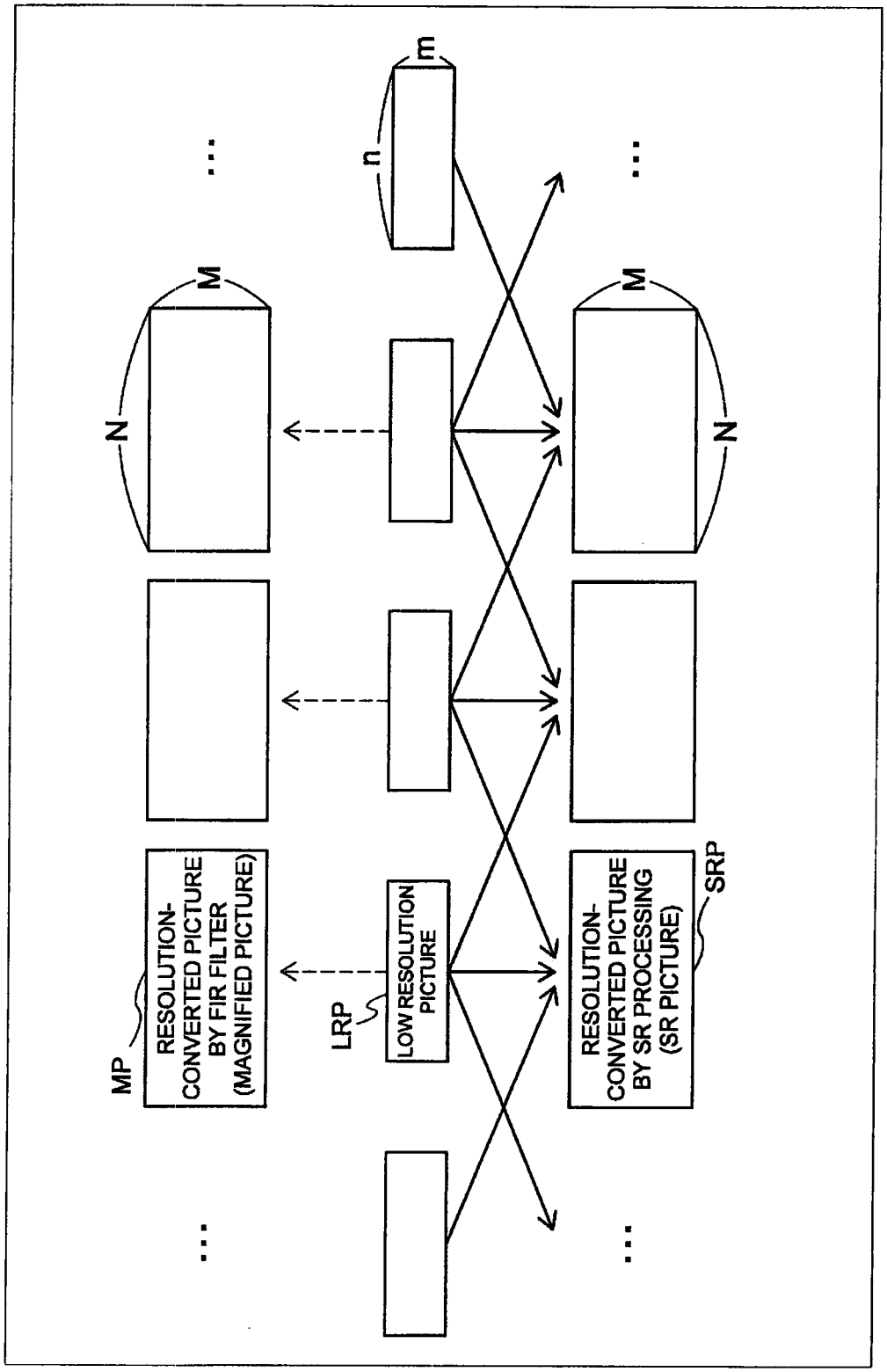
FIG. 2 is an explanatory diagram showing the differences between resolution conversion using an FIR filter and super resolution processing.

As explained below, the image processing device according to an embodiment of the present invention does not perform motion estimation using a magnified picture MP generated using a finite impulse response (FIR) filter or the like, but performs motion estimation using a super resolution picture (SRP) generated by super resolution processing, as shown in FIG. 2. FIG. 2 is an explanatory diagram illustrating the differences between resolution conversion using an FIR filter or the like, and resolution conversion by super resolution processing according to the present embodiment.

As shown in FIG. 2, when converting image resolution using an FIR filter or the like, magnification processing is performed based on a single low resolution picture LRP and a magnified picture MP is generated. With this method, pixel values are interpolated using proximal pixel values. This interpolation process generates a smooth signal. However, when converting image resolution using super resolution processing, a plurality of low resolution picture LRPs are used to generate a super resolution picture SRP. Super resolution processing is a method using a plurality of low resolution picture LRPs with a distortion of one pixel or less, and the pixel values for corresponding pixels are combined to reconstruct the pixels. Using this method, motion vector estimation can be significantly improved in comparison to methods using an FIR filter or the like to generate magnified picture MP images. For that reason, the image processing device according to the present embodiment can generate a high resolution created picture CP (t+h). Detailed structural examples will be explained below of an image processing device that can achieve these technical concepts.

(Embodiment of the Present Invention)

First, an image processing device 100 according to a first embodiment of the present invention will be explained.

(Structure of the Image Processing Device 100)

Figure 3:
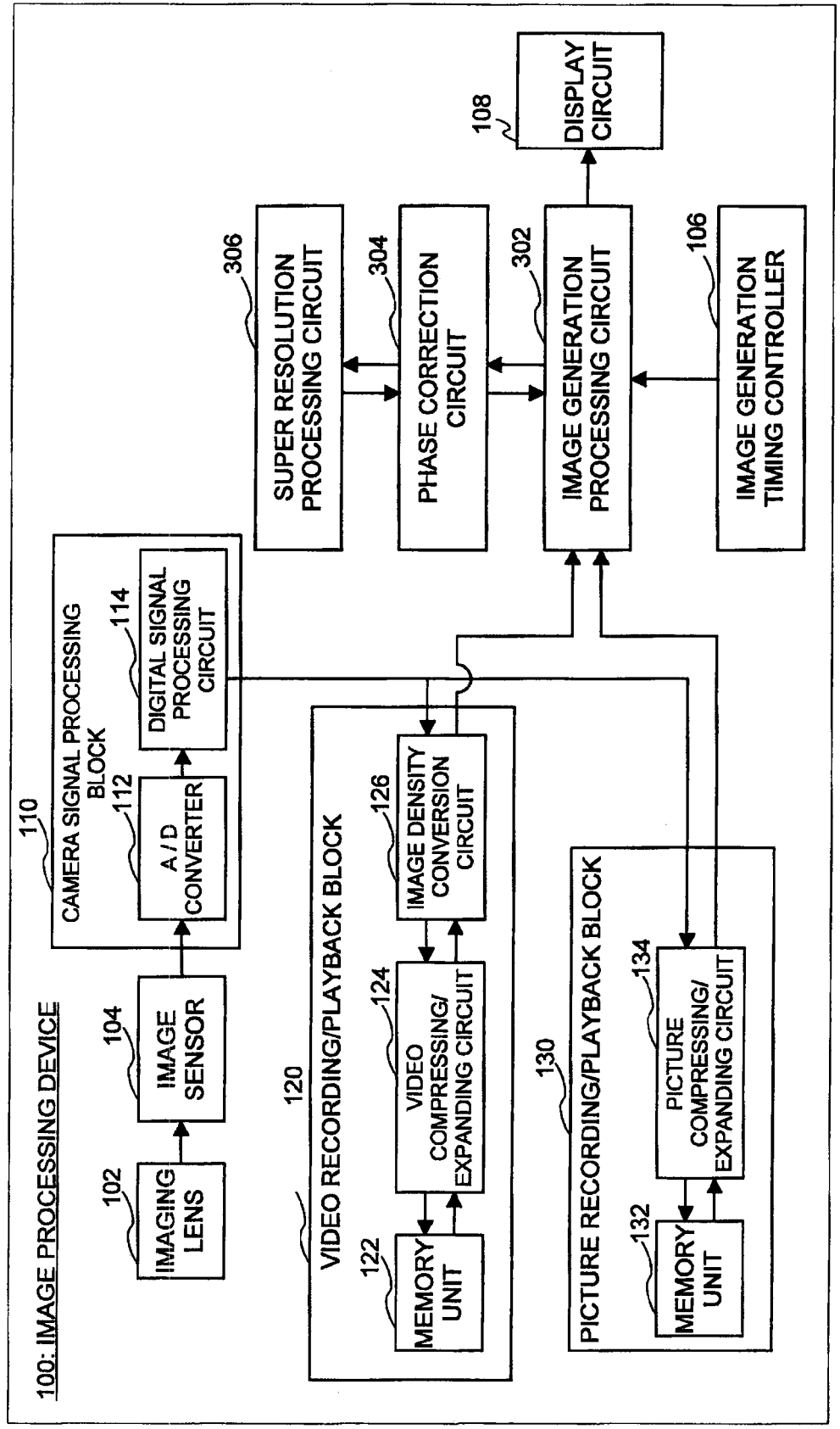
FIG. 3 is an explanatory diagram showing the structure of an image processing device according to an embodiment of the present invention.

First, the structure of the image processing device 100 according to the present embodiment will be explained with reference to FIG. 3. FIG. 3 is an explanatory diagram showing an example of the structure of the image processing device 100 according to the present embodiment.

As shown in FIG. 3, the image processing device 100 mainly includes an imaging lens 102, an image sensor 104, a camera signal processing block 110, a video recording/playback block 120, a picture recording/playback block 130, an image generation processing circuit 302, a phase correction circuit 304, a super resolution processing circuit 306 and a display circuit 108. The phase correction circuit 304 is an example of the phase distortion detection unit, phase distortion correction unit or motion vector compensation unit. Also, the super resolution processing circuit 306 is an example of the super resolution processing unit.

The imaging lens 102 condenses light and is an optical lens that forms an image of a subject (hereinafter sometimes referred to as the "condensed image"). The image sensor 104 is a photo-electric element that converts the light condensed by the imaging lens 102 into an electrical signal. The image sensor 104 uses semiconductor elements, such as a charge coupled device (CDD) image sensor or a complementary metal oxide semiconductor (CMOS) image sensor. Also, the image sensor 104 has a greater pixel count than the spatial resolution effective pixel count of the video data.

The display circuit 108 displays the image data on a display device (not shown in the figures) when the image data is recorded or played back, or when the image data is being checked by a user. An image generation timing controller 106 is a device that allows the operator to instruct that picture data be obtained while video data is being played back.

(Camera Signal Processing Block 110)

As shown in FIG. 3, the camera signal processing block 110 includes an A/D converter 112 and a digital signal processing circuit 114.

The A/D converter 112 is an analog-to-digital converter that converts an analog signal to a digital signal and outputs the digital signal. The A/D converter 112 converts an analog signal of the condensed image received from the image sensor 104 to a digital signal and outputs the digital signal to the digital signal processing circuit 114. The digital signal processing circuit 114 performs white balance adjustment and gamma correction etc. on the condensed image digital signal (hereinafter referred to as "image data") received from the A/D converter 112.

(Video Recording/Playback Block 120)

The video recording/playback block 120, as shown in FIG. 2, includes an image density conversion circuit 126, a video data compressing/expanding circuit 124, and a memory unit 122.

When recording the video data, the image density conversion circuit 126 performs thinning out processing (for example, encoding the differences between the frames etc.) on the series of image data (the video data) received from the digital signal processing circuit 114. The image density conversion circuit 126 outputs the video data after the thinning out processing to the video data compressing/expanding circuit 124. The video data compressing/expanding circuit 124 compresses the thinned out data received from the image density conversion circuit 126, and records the compressed video data to the memory unit 122.

When playing back the video data, the video data compressing/expanding circuit 124 first reads and then expands the video data stored in the memory unit 122. The video data compressing expanding circuit 124 then inputs the expanded video data to the image density conversion circuit 126. The image density conversion circuit 126 interpolates the expanded data received from the video data compressing/expanding circuit 124 (for example, reconstructs the differentiated data etc.).

(Picture Recording/Playback Block 130)

As shown in FIG. 3, the picture recording/playback block 130 includes a picture data compressing/expanding circuit 134 and a memory unit 132. The memory unit 132 can also use a common memory device with the memory unit 122 and can realize the functions of the memory unit 132.

When recording the picture data, the picture data compressing/expanding circuit 134 compresses the image data received from the digital signal processing circuit 114 and records the data to the memory unit 132. When playing back the picture data, the picture data compressing/expanding circuit 134 first reads and then expands the image data stored in the memory unit 132.

(Image Generation Processing Circuit 302)

The image generation processing circuit 302 includes a motion estimation unit 312 (not shown in the figures) and a motion compensation unit 314 (not shown in the figures). The motion estimation unit 312 is an example of the motion estimation unit. Also, the motion compensation unit 314 is an example of the image generation unit.

The motion estimation unit 312 performs motion estimation between the frames of the video data transmitted from the video recording/playback block 120, and detects the motion vector. The motion estimation unit 312, for example, selects the picture data recorded at the point in time closest to the frame recorded at a predetermined time. Then, the motion estimation unit 312 performs motion estimation between the frame that corresponds to the selected picture data and the frame recorded at the predetermined time, and detects the motion vector between the frames. At that time, the motion estimation unit 312 performs super resolution processing on each frame (LRP) it refers to and detects the motion vector using the resolution-converted super resolution pictures (SRP).

As another example, the motion estimation unit 312 may extract a plurality of picture data recorded at points in time close to the frame recorded at the predetermined time, and select a frame that corresponds to the picture data that is most similar to the frame recorded at the predetermined time. Then, the motion estimation unit 312 may perform motion estimation between the frame that corresponds to the selected picture data and the frame recorded at the predetermined time, and detect the motion vector between the frames.

The motion compensation unit 314 performs motion compensation based on the motion vector data received from the motion estimation unit 312 and the picture data received from the picture recording/playback block 130. For example, the motion compensation unit 314 identifies a picture data reference block that corresponds to a reference block in the frame recorded at the predetermined time, based on the motion vector. The motion compensation unit 314 merges at a predetermined ratio the picture data reference block and the reference block of the frame recorded at the predetermined time and generates the created picture (CP).

Further, when generating the created picture CP, the image generation processing circuit 302 monitors the amount of difference between the super resolution picture SRP that corresponds to the created picture CP and the referent image. When the amount of difference between the high resolution picture HRP and the super resolution picture SRP is small, the image generation processing circuit 302 can output the high resolution picture HRP as it is, as the created picture CP. This can occur when capturing a completely still subject.

As described above, one factor causing deterioration in the accuracy of motion estimation is the low spatial resolution of the image data transmitted from the video recording/playback block 120. In contrast to the picture data captured at high resolution, the high spatial resolution image data after resolution conversion does not contain high frequency components. In this case, even when performing detailed motion estimation with an accuracy at the level of fractional-pixel counts or integer-pixel counts, it becomes a matter of comparison between signals that are not included in the image data. For that reason, the accuracy of motion estimation can deteriorate significantly depending on the magnification ratio.

(Super Resolution Processing Circuit 306, Phase Correction Circuit 304)

The image processing device 100 according to the present embodiment includes the super resolution processing circuit 306 that performs resolution conversion on the low resolution picture LRP by super resolution processing. The technical configurations relating to super resolution processing by the super resolution processing circuit 306 and the like will now be explained in more detail.

First, the image generation processing circuit 302 inputs the low resolution picture LRP received from the video recording/playback block 120 to the super resolution processing circuit 306 via the phase correction circuit 304. The super resolution processing circuit 306 uses the low resolution picture LRPs corresponding to a plurality of video data frames to convert each low resolution picture LRP to a high resolution image using super resolution processing. Then, the super resolution processing circuit 306 inputs the high resolution-converted super resolution picture SRP to the phase correction circuit 304.

Figure 4:
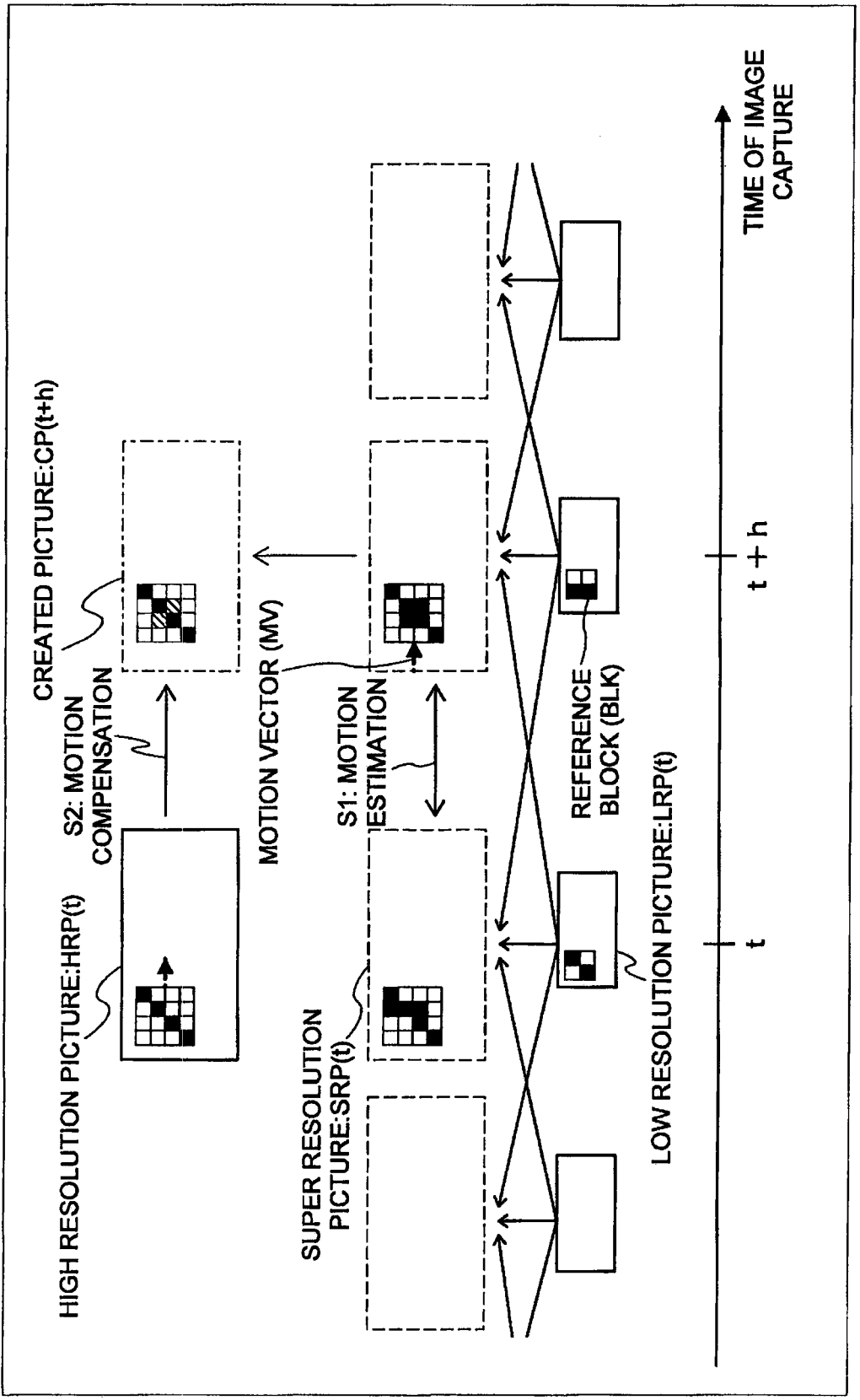
FIG. 4 is an explanatory diagram illustrating the operation of an image generation processing circuit according to the present embodiment.

As shown in FIG. 4, the super resolution processing circuit 306 first gathers the data for a plurality of LRP frames corresponding to the video data and generates a single high resolution picture. The plurality of low resolution picture LRPs used for the super resolution processing are captured at different points in time. For that reason, even if the subject is the same, signals with differing phase are often included. Here, based on the super resolution processing method, by using phase overlapping, the high frequency components included in the plurality of LRPs can be overlapped, and the output image data resolution can be improved. The number of input LRPs can be two or more, up to the limit of the memory capacity and arithmetic processing capabilities of the image processing device.

Even when using the super resolution processing circuit 306, the low spatial resolution image data before resolution conversion is not completely reconstructed. However, super resolution processing corrects high frequency components to a certain extent. For that reason, motion estimation accuracy is significantly improved. In other words, high frequency components are generated and corrected by super resolution processing and the comparison of image signals can be performed with a greater degree of accuracy.

Next, the phase correction circuit 304 compares the low resolution picture LRP (or magnified picture MP magnified using an FIR filter or the like) transmitted from the image density conversion circuit 126 with the super resolution picture SRP transmitted from the super resolution processing circuit 306, and performs phase correction on the super resolution picture SRP transmitted from the super resolution processing circuit 306. Then, the super resolution processing circuit 306 inputs the phase-corrected super resolution picture SRP to the image generation processing circuit 302. The image generation processing circuit 302 performs motion compensation based on the super resolution picture SRP received from the phase correction circuit 304 and the high resolution picture HRP received from the picture recording/playback block 130 and generates the created picture CP.

After that, the image generation processing circuit 302 outputs the created picture CP to the display circuit 108. The image density conversion circuit 126 is an example of the magnified image generating unit.

Figure 5:
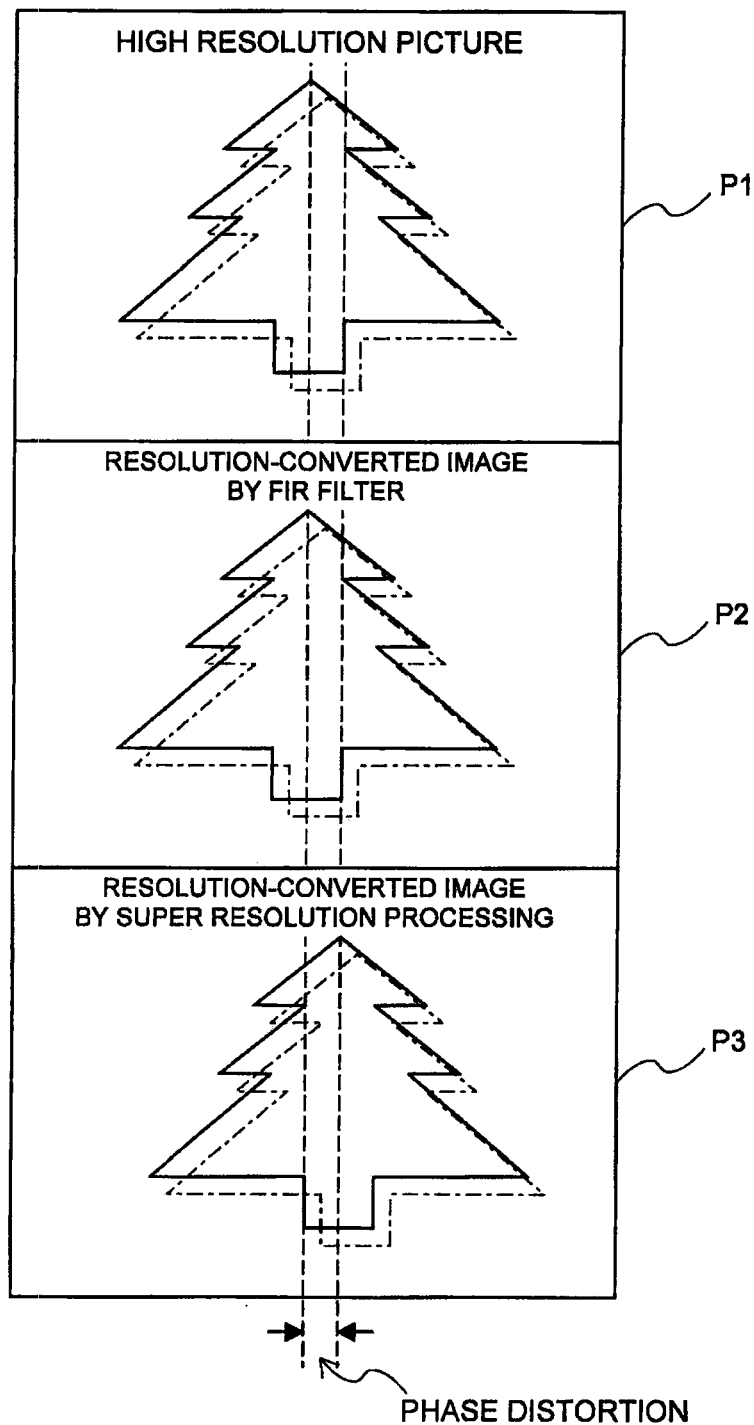
FIG. 5 is an explanatory diagram illustrating the operation of a phase correction circuit according to the present embodiment.

In the above way, the image data (SRP) on which super resolution processing has been performed by the super resolution processing circuit 306, and the image data that has been resolution converted via the image density conversion circuit 126 are input into the phase correction circuit 304. As shown in FIG. 5, the former SRP data has high frequency components added by super resolution processing. The latter image data has only been subject to resolution conversion using an FIR filter or the like, and high frequency components are therefore not added. However, the latter image data is less vulnerable to the phase distortion that occurs in line with the conversion to a higher resolution. On the other hand, the former SRP image data includes processing involving the summing of a plurality of images, and in principle, is more vulnerable to phase distortion. Phase distortion between the images used in the motion estimation and the images used in the motion compensation lead to a deterioration in quality.

Here, the phase correction circuit 304 calculates the amount of phase distortion between the super resolution picture SRP received from the super resolution processing circuit 306 and the magnified picture MP received from the video recording/playback block 120. Methods that can be applied to the present embodiment to calculate the amount of correction can include, for example, motion estimation by phase correlation, block matching or the like. Here, some kind of motion estimation method is used. If there is uniform phase distortion of the whole image, an appropriate method for the above-described motion estimation is phase correlation or the like. On the other hand, if the amount of phase distortion differs depending on the region within the image, an appropriate method for the above-described motion estimation is block matching or the like. If a reduced image is created, motion estimation can be achieved in a relatively easy manner.

Next, the phase correction circuit 304 uses the amount of phase distortion calculated using the above-described methods to perform phase correction on the super resolution picture SRP received from the super resolution processing circuit 306. If distortion occurs at an integer-pixel level of accuracy, correction can be made by simply shifting the whole image. If distortion occurs at a fractional-pixel level of accuracy (for example, at half-pixel level or the like), correction can be performed in combination with correction processing by an FIR filter. In this method, the image is temporarily magnified, and fractional-pixel distortion is magnified to be handled as integer-pixel distortion.

The phase correction circuit 304 may also perform phase correction not by correcting phase distortion occurring in the super resolution picture SRP but by using a method to correct motion data such as the motion vector detected between super resolution picture SRPs. In other words, the image generation processing circuit 302 performs motion estimation using the super resolution picture SRP output from the super resolution processing circuit 306. Then, the image generation processing circuit 302 corrects the detected motion vector by adding the amount of phase distortion calculated by the phase correction circuit 304. After that, the image generation processing circuit 302 performs motion compensation using the high resolution picture HRP output from the picture recording/playback block 130. By this correction processing, super resolution picture SRP phase distortion occurring in the super resolution processing circuit 306 is cancelled.

(Recording of the Image Data)

Next, a simple explanation will be given of the recording of the image data by the image processing device 100 according to the present embodiment.

First, an operator instructs the image processing device 100 to start recording (step S10). The image processing device 100 receives the instruction and starts continuous recording of the frames that form the video data (step S12). The image processing device 100 obtains the condensed image via the imaging lens 102 (step S14). Next, the image processing device 100 uses the image sensor 104 to perform photoelectric conversion on the condensed image and generates an analog signal (step S16). Then the image processing device 100 inputs the analog signal into the A/D converter 112 and converts the analog signal to a digital signal (step S18). Next, the image processing device 100 inputs the digital signal into the digital signal processing circuit 114 and performs processing, such as white balance adjustment and gamma correction, on the image data that corresponds to the digital signal (step S20). The image processing device 100 can accumulate the image data and form video data.

Next, the image processing device 100 uses the image density conversion circuit 126 to perform thinning out on the video data (step S22). When performing step S22, the number of effective pixels can be obtained for each video signal format, such as the National Television Standards Committee (NTSC) method, the Phase Alteration by Line (PAL) method, or the Integrated Services Digital Broadcasting (ISDB) method. The image processing device 100 then uses the video data compressing/expanding circuit 124 to compress the thinned out video data (step S24) and record the video data in the memory unit 122 (step S25). Also, the image processing device 100 uses the picture data compressing/expanding circuit 134 to intermittently obtain and compress the image data (the picture data) at a predetermined interval (step S32) and store the picture data in the memory unit 132 (step S34).

(Playing Back of the Image Data)

Next, a simple explanation will be given of the playing back of the image data by the image processing device 100 according to the present embodiment.

The operator uses the image generation timing controller 106 to instruct the image processing device 100 to start playback (step S50). The image processing device 100 receives the instruction and starts the generation of high quality image data that has higher spatial resolution than the video data, recorded for a point in time at which the picture data is not recorded (step S52). The image processing device 100 reads the compressed video data stored in the memory unit 122 (step S54) and uses the video data compressing/expanding circuit 124 to expand the video data (step S56). Next, the image processing device 100 uses the image density conversion circuit 126 to perform correction processing on the expanded video data (step S58). In the step S58, each frame of the video data is converted to image data that has the same number of pixels as the picture data. The video data is then transmitted to the image generation processing circuit 302 (step S60).

The image processing device 100 uses the picture data compressing/expanding circuit 134 to read the picture data stored in the memory unit 132, expand the picture data (step S72) and transmits the picture data to the image generation processing circuit 302.

(Operations of the Image Generation Processing Circuit 302)

Here, the operations of the image generation processing circuit 302 will be explained with reference to FIG. 4. FIG. 4 is an explanatory diagram illustrating the processing operations of the image generation processing circuit 302.

In FIG. 4, the high resolution picture HRP (t), a plurality of low resolution pictures LRP (t), and low resolution pictures LRP (t+h) and so on, and the created picture CP (t+h) are shown in correspondence to the time of image capture. FIG. 4 is an illustration of the processing operations to generate the created picture CP (t+h) corresponding to the low resolution picture LRP (t+h) recorded at the time t+h.

For the high resolution picture HRP, it is assumed that the number of horizontal pixels is N, the number of vertical pixels is M and the frame rate is 1/ΔT (fps). Also, for the low resolution picture LRP, it is assumed that the number of horizontal pixels is n, the number of vertical pixels is m, and the frame rate is 1/Δt (fps). It is assumed that each variable satisfies the relationships N≥n, M≥m, and ΔT≥Δt. Further, it is assumed that the variable h satisfies the relationship 0≤h≤ΔT.

The method for generating the created picture CP (t+h) for the time t+h will be explained with reference to the example shown in FIG. 4. However, the processing method of the image processing device 100 according to the present embodiment is not limited to this example. For example, the image processing device 100 can additionally refer to a high resolution picture HRP (t+ΔT) for another time t+ΔT (not shown in the figure) to generate the created picture CP (t+h). At that time, the image processing device 100 may also perform processing to select the high resolution picture HRP that is to be referred to, depending on the extent and the speed of motion and so on of the subject.

(Step S1)

First, the motion estimation unit 312 of the image processing device 100 uses the super resolution picture SRP (t) and the super resolution picture SRP (t+h) to perform motion estimation and detect the motion vector (MV) between the super resolution picture SRP (t) and the super resolution picture SRP (t+h). As the super resolution picture SRPs are used to predict the motion vector MV, a high degree of motion estimation accuracy can be achieved. Methods of motion estimation that can be applied to the present embodiment include block matching, phase correlation or optical flow methods.

(Step S2)

Next, the motion compensation unit 314 of the image processing device 100 uses the motion vector MV and the high resolution picture HRP (t) to perform motion compensation. The motion compensation unit 314 uses the motion vector MV to identify the high resolution picture HRP (t) reference block that corresponds to the super resolution picture SRP (t+h) reference block. Then, the motion compensation unit 314 merges at a predetermined ratio the identified high resolution picture reference block and the super resolution picture SRP (t+h) reference block to generate the created picture CP (t+h).

When the created picture CP is generated, the image generation processing circuit 302 can also refer to images apart from the images described above. The explanation here describes motion estimation and motion compensation by reference to images that are positioned later in temporal terms (forward direction prediction), but motion estimation and motion compensation can be performed by reference to images that are positioned earlier in temporal terms (backward direction prediction). Alternatively, motion estimation and motion compensation may be performed with reference to both the earlier and later images. Further, the image generation processing circuit 302 can generate the created picture CP by reference to a plurality of images that are positioned earlier or later in temporal terms.

In the way described above, the functions of the image generation processing circuit 302 according to the present embodiment can be modified in a variety of ways. For example, if a high resolution picture HRP (t+ΔT) exists at the time t+ΔT (h<ΔT), the image generation processing circuit 302 can compare a created picture CP that is corrected and generated from an earlier point based on the high resolution picture HRP (t+ΔT) with a created picture CP that is corrected and generated consecutively from a later point according to the above-described method, and can select the image with the higher quality. Taking this selection application and the like into account, the image generation processing circuit 302 may, for example, compare the super resolution picture SRP (t) and the super resolution picture SRP (t+ΔT) etc. for the time t, and t+ΔT etc. and monitor the difference.

When performing motion estimation, the image generation processing circuit 302 can combine prediction processing in both directions. In other words, the image generation processing circuit 302 performs motion compensation based on motion vectors for a plurality of prediction sources, performs weighting on the motion compensation pixel values and averages them out. To give a simple example, a pixel C following prediction can be calculated in relation to the prediction dimension pixel A and the prediction dimension pixel B according to the following Formula (1).

(Formula 1)

$$C=(A+B)/2 \qquad (1)$$

This is a method to obtain an average value with an equal weighting ratio. Compared to prediction made in one direction, by performing prediction in both directions, the energy difference can be reduced. This method is well known in relation to image compression technologies, such as the Moving Picture Experts Group (MPEG) technology and so on. As the present embodiment also combines predictions in both directions, it is thought that the quality of the created picture CP can therefore be further improved. Further, as in known both-direction prediction technologies for the H.264 standard etc., the prediction directions for two vectors can be set in the same direction in temporal terms (in the forward direction or the backward direction).

When generating the created picture CP, a relatively easy both-direction prediction method may be, for example, a method to use the created picture CP (t+h) generated by using the average value between the two high resolution pictures HRP (t) and HRP (t+ΔT). This method is effective for images of a stationary subject that include fade.

If the subject includes moving objects, the image generation processing circuit 302 can perform both-direction prediction in relation to the super resolution picture SRP (t+h) and the super resolution picture SRP (t), and can perform motion compensation based on the high resolution picture HRP (t) and the high resolution picture HRP (t+ΔT). The image generation processing circuit 302 can also use the subject motion data between the super resolution picture SRP (t+h) and the super resolution picture SRP (t), or the subject motion data between the super resolution picture SRP (t+h) and the super resolution picture SRP (t+ΔT) to improve the picture quality of the created picture CP (t+h).

(Image Processing Method)

Figure 6:
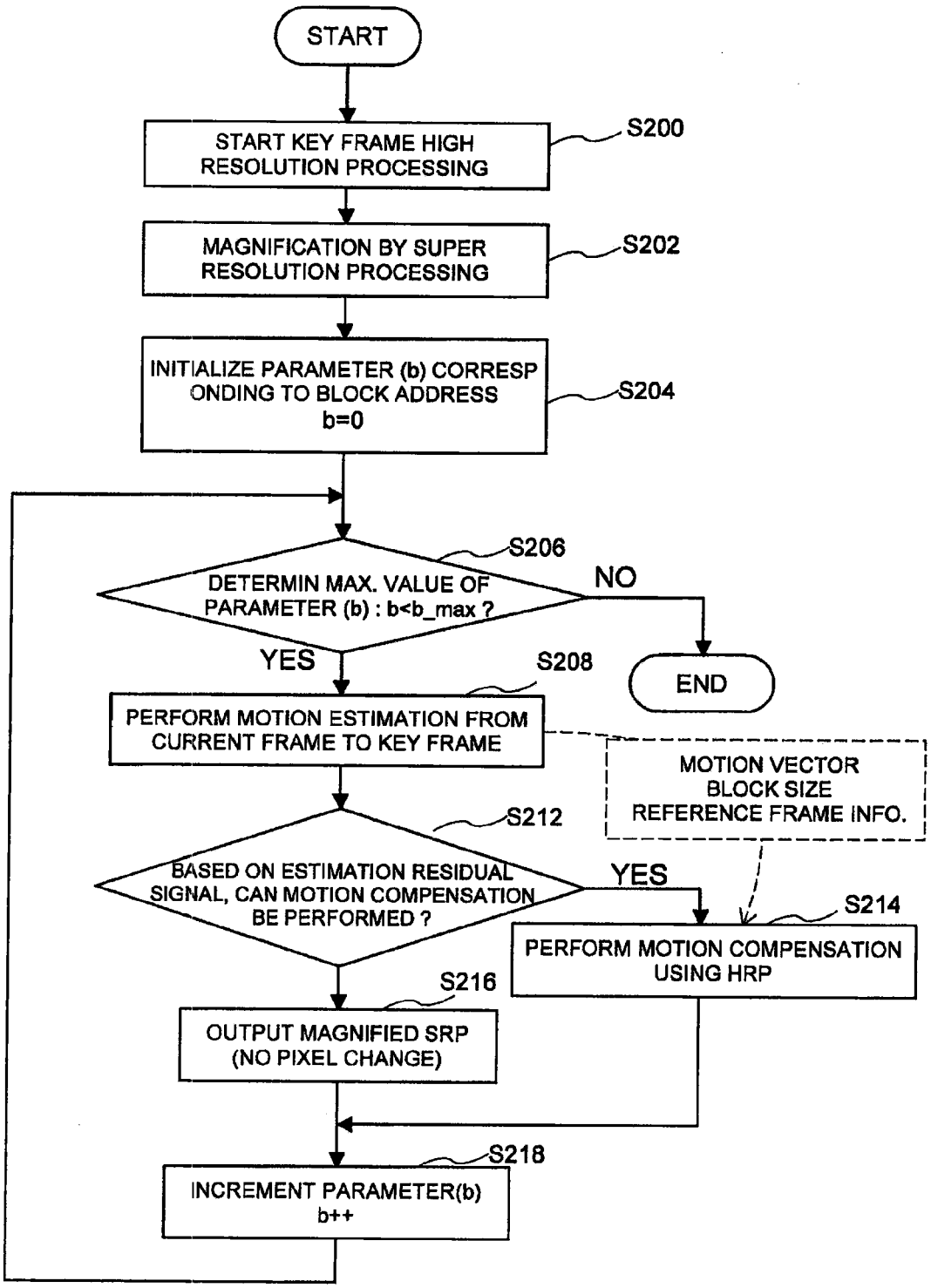
FIG. 6 is an explanatory diagram showing a high resolution image generation method according to the present embodiment.

Here, the image processing method according to the present embodiment will be explained with reference to FIG. 6. FIG. 6 is an explanatory diagram showing the flow of image generation processing according to the present embodiment.

First, the image generation processing circuit 302 starts key frame high resolution processing (step S200). Next, the super resolution processing circuit 306 performs super resolution processing on the low resolution picture LRP to generate a super resolution picture SRP that has the same spatial resolution as the high resolution picture HRP (step S202). Next, the parameter b that indicates the position of the reference block is initialized (step S204). It is then determined whether the parameter b exceeds the maximum value b_max of the parameter b or not (step S206). Here, b_max is the number of blocks included in the frame.

When b≥b_max, the image generation processing circuit 302 ends the image generation process. When b<b_max, the motion estimation unit 312 performs motion estimation from the current frame (SRP (t+h)) to a key frame (SRP (t)) (step S208). Next, the image generation processing circuit 302 determines whether or not motion compensation can be performed or not, based on the size of the estimation residual signal (step S212).

If it is determined in the step S212 that motion compensation cannot be performed, the motion compensation unit 314 outputs the super resolution picture SRP (t+h) magnified in step S202 as the created picture CP (t+h).

If it is determined in the step S212 that motion compensation can be performed, the motion compensation unit 314 uses the high resolution picture HRP (t) to perform motion compensation (step S214). At that time, the motion compensation unit 314 uses the motion vector obtained in the step S208 from the current frame to the key frame, the unit block size and the reference frame data etc.

The image generation processing circuit 302 then increments the parameter b (step S218), and starts processing once more from the step S206. In this way, when performing motion compensation, the image generation processing circuit 302 determines whether or not motion compensation is possible while determining the image difference. For that reason, it is possible to minimize the noise that occurs in the created picture CP (t+h) that results from low motion estimation accuracy.

(Deformed Example)

Figure 7:
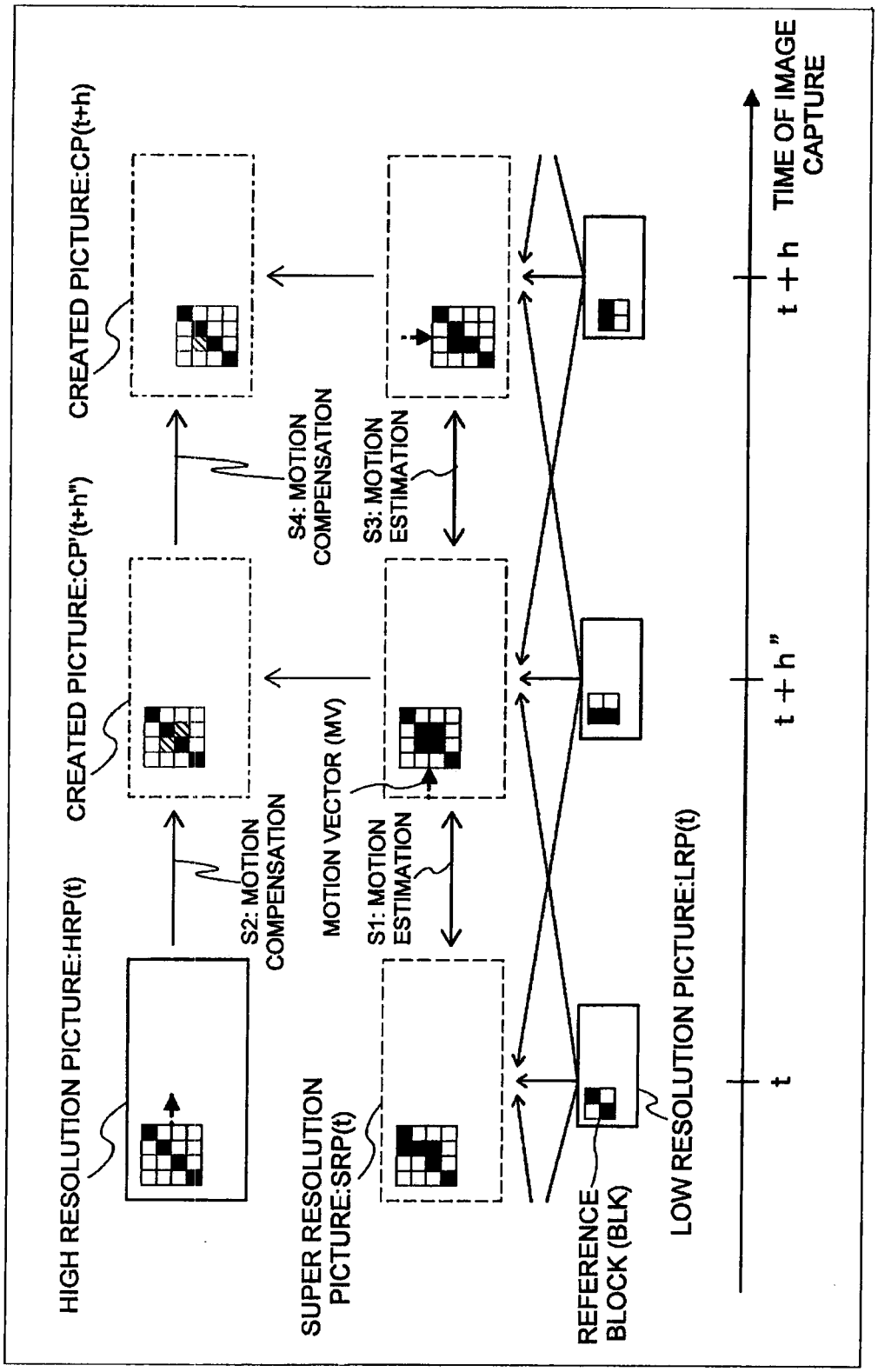
FIG. 7 is an explanatory diagram showing a high resolution image generation method according to a modified example of the present embodiment.

Also, consecutive sequence motion compensation can be performed as shown in FIG. 7. An intermediate created picture CP' (t+h")(t<h"<h) is generated using the high resolution picture HRP (t), and then the intermediate created picture CP' (t+h") is used to generate the created picture CP (t+h). FIG. 7 is an explanatory diagram showing an image generation method according to a deformed example of the present embodiment. As shown here, the present embodiment is not limited to the above descriptions, but can be deformed in a variety of ways. Also, the functions performed by each of the structural members of the image processing device 100 can be performed, for example, by an information processing device using a computer program, as in the example shown below.

(Hardware Configuration)

The functions of the image processing device 100 can be performed, for example, by an information processing device with the hardware configuration shown in FIG. 8. FIG. 8 is an explanatory diagram showing an example of the hardware configuration of an information processing device that can perform the functions of each of the structural members of the image processing device 100.

As shown in FIG. 8, the information processing device mainly includes a central processing unit (CPU) 902, a read only memory (ROM) 904, a random access memory (RAM) 906, a host bus 908, a bridge 910, an external bus 912, an interface 914, an input unit 916, an output unit 918, a memory unit 920, a drive 922, a connection port 924, and a communication unit 926.

The CPU 902, for example, functions as an arithmetic processing unit or a control unit, and controls all or part of the operations of each structural member based on the various programs recorded in the ROM 904, the RAM 906, the memory unit 920 or a removable recording medium 928. The ROM 904 stores, for example, programs to be read into the CPU 902 or data used in computing. The RAM 906 temporarily or permanently stores, for example, programs to be read into the CPU 902 or various parameters etc. that change appropriately when executing the programs. These structural members are mutually connected, for example, by the host bus 908 that allows high speed data transmission. The host bus 908, for example, is connected via the bridge 910 to the external bus 912 that has a comparatively low data transmission speed.

The input unit 916 is an operation device, such as, for example, a mouse, a keyboard, a touch panel, a button, a switch, a lever or the like. The input unit 916 may also be a remote control device (a so-called "remote control") that can use infrared rays or other radio waves to transmit control signals. The input unit 916 is formed of an input control circuit and the like, designed to transmit the input data as an input signal to the CPU 902 using the above-described operation device.

The output unit 918 is, for example, a display device, such as a cathode ray tube (CRT), a liquid crystal display (LCD), a plasma display panel (PDP) or an electro-luminescent display (ELD) etc., an audio output device, such as a speaker or headphone etc., or a printer, a cellular telephone or a facsimile machine etc. that provides a user with information about the obtained data by an audio or visual device or the like.

The memory unit 920 is a device to store all kinds of data, and is formed, for example, of a magnetic storage device, such as a hard disk drive (HDD), or a semiconductor storage device, an optical storage device or a magneto-optical storage device or the like.

The drive 922 is a device that reads, for example, the data stored in the removable recording medium 928 (that is, for example, a magnetic disk, an optical disk, or a magneto-optical disk or the like), or writes the data into the removable recording medium 928. The removable recording medium 928 may be, for example, DVD media, Blu-ray™ media, HD-DVD media, CompactFlash™ (CF) memory, a memory stick, or a secure digital (SD) memory card or the like. Of course, the removable recording medium 928 may alternatively be, for example, an integrated circuit card (IC card) with a non-contact IC chip, or an electronic device or the like.

The connection port 924 is, for example, a universal serial bus (USB), an IEEE 1394 port, a small computer system interface (SCSI), an RS-232 port, or an optical audio port or the like to connect an externally connected device 930. The externally connected device 930 is, for example, a printer, a portable music player, a digital camera, a digital video camera, or an IC recorder or the like.

The communication unit 926 is a communication device to connect to a network 932, and may be, for example, a wired or wireless local area network (LAN), a Bluetooth™ or wireless USB (WUSB) communication card, a router for optical communications, an asymmetric digital subscriber line (ADSL) router, or any kind of communication modem or the like. Also, the network 932 connected to the communication unit 926 is formed of a wired or wirelessly connected network, and is, for example, the Internet, a household LAN, an infrared communications network, a broadcast network or a satellite communications network or the like.

This completes the explanation of the structure of the image processing device 100 according to the present embodiment, and the explanation of the image processing method. As described above, the present embodiment relates to technology using super resolution technology and motion compensation technology in combination. As motion compensation is performed using high resolution picture HRPs that include high frequency components, higher quality image data can be obtained than when using super resolution technology that performs motion compensation on the high frequency components using only low resolution picture LRPs. Also, as motion estimation accuracy can be improved, super resolution merits can be obtained that are not included in general super resolution processing.

It should be understood by those skilled in the art that various modifications, combinations, sub-combinations and alterations may occur depending on design requirements and other factors insofar as they are within the scope of the appended claims or the equivalents thereof.

For example, in the above explanation of the present embodiment, motion estimation and motion compensation in a forward direction (using a later frame) are explained, but the technological range of the present embodiment is not limited to this example, and motion estimation and motion compensation can be performed in a backward direction (using an earlier frame) or in both directions (using both earlier and later frames).

What is claimed is:

1. An image processing device comprising:
    an image acquisition unit that obtains:
        first video data that includes a plurality of frames; and
        second video data that includes a plurality of frames, the frames of the second video data having a resolution higher than the frames of the first video data;
    a super resolution processing unit that performs super resolution processing on the frames of the first video data to generate super resolution images;
    a motion prediction unit that detects a motion vector between the super resolution images;
    an image generation unit that, based on the second video data and on the motion vector, generates motion-compensated image data that corresponds to the frames of the first video data;
    an image compressing/expanding unit that compresses the first and second video data; and
    first and second memory units that record the compressed first and second video data, respectively,
    wherein:
    the first video data, having low spatial resolution and high temporal resolution, is recorded into the first memory unit; and
    the second video data which corresponds to the frames included in the first video data, having higher spatial resolution and lower temporal resolution than the first video data, is recorded into the second memory unit.

2. The image processing device according to claim 1, wherein
    the first video data has lower spatial resolution than the second video data, and
    the second video data has higher spatial resolution than the first video data.

3. The image processing device according to claim 1, wherein
    the first video data has higher temporal resolution than the second video data, and
    the second video data has lower temporal resolution than the first video data.

4. The image processing device according to claim 1, further comprising:
    a magnified image generation unit that generates a magnified image with the same spatial resolution as one of the super resolution images by using one of the frames; and
    a phase distortion detection unit that detects phase distortion between the super resolution image and the magnified image which correspond to one of the frames.

5. The image processing device according to claim 4, further comprising:
    a phase distortion correction unit that, based on the phase distortion detected by the phase distortion detection unit, corrects the phase distortion of the super resolution image.

6. The image processing device according to claim 4, further comprising:
    a motion vector compensation unit that, based on the phase distortion detected by the phase distortion detection unit, corrects the result of the motion vector estimation between the super resolution images.

7. The image processing device according to claim 4, wherein
    the super resolution processing unit performs super resolution processing without performing resolution conversion on the frame.

8. The image processing device according to claim 7, wherein
    the magnified image generation unit performs resolution conversion on the frame on which super resolution processing has been performed, and generates the magnified image; and
    the motion estimation unit detects the motion vector between the magnified images.

9. The image processing device according to claim 1, wherein the image generation unit:
    designates one of the frames that is included in the first video data and that is not included in the second video data as a selected frame; and
    generates the image data corresponding to the selected frame, so as to improve the temporal resolution of the second video data.

10. The image processing device according to claim 1, wherein
    the video data that is recorded in the first memory unit is a series of image data obtained by performing downsampling on captured image signals.

11. An imaging method comprising:
    obtaining:
        first video data that includes a plurality of frames; and
        second video data that includes a plurality of frames, the frames of the second video data having a resolution higher than frames the first video data via an image acquisition unit;
    performing super resolution processing on the frames of the first video data to general super resolution images;
    detecting a motion vector between the super resolution images;
    generating, based on the second video data and the motion vector, motion-compensated image data that corresponds to the frames of the first video data;
    compressing the first and second video data; and
    recording the compressed first and second video data in first and second memory units, respectively, wherein:
the first video data, having low spatial resolution and high temporal resolution, is recorded into the first memory unit; and
the second video data which corresponds to the frames included in the first video data, having higher spatial resolution and lower temporal resolution than the first video data, is recorded into the second memory unit.

12. A non-transitory computer-readable storage medium storing a program that, when executed by a computer, causes the computer to perform a method the method comprising:
obtaining:
first video data that includes a plurality of frames; and
second video data that includes a plurality of frames, the frames of the second video data having a resolution higher than frames the first video data via an image acquisition unit;
performing super resolution processing on the frames of the first video data to general super resolution images;
detecting a motion vector between the super resolution images;
generating, based on the second video data and the motion vector, motion-compensated image data that corresponds to the frames of the first video data;
compressing the first and second video data; and
recording the compressed first and second video data in first and second memory units, respectively,
wherein:
the first video data, having low spatial resolution and high temporal resolution, is recorded into the first memory unit; and
the second video data which corresponds to the frames included in the first video data, having higher spatial resolution and lower temporal resolution than the first video data, is recorded into the second memory unit.

* * * * *